Feb. 10, 1959     F. LEISTER     2,873,128

LOCKING MEANS FOR SECURING A BEARING TO A SHAFT

Original Filed Sept. 14, 1950

Inventor
Fayette Leister
By Mitchell Bechert
Attorneys

United States Patent Office 2,873,128
Patented Feb. 10, 1959

2,873,128

LOCKING MEANS FOR SECURING A BEARING TO A SHAFT

Fayette Leister, New Britain, Conn., assignor to The Fafnir Bearing Company, New Britain, Conn., a corporation of Connecticut Original application September 14, 1950, Serial No. 184,730, now Patent No. 2,697,622, dated December 21, 1954. Divided and this application June 25, 1954, Serial No. 439,361

2 Claims. (Cl. 287—52.09)

My invention relates to locking means for securing a bearing ring or the like to a shaft or other mounting means. The invention is in the nature of an improvement over the copending patent application of John A. Frederick, Serial No. 169,425, filed June 21, 1950, now Patent 2,697,621, and over my pending application, Serial No. 169,447, filed July 21, 1950, now Patent 2,729,479.

This application is a division of my application, Serial No. 184,730, filed September 14, 1950, now Patent 2,697,622.

It is an object of the invention to provide an improved device of the character indicated.

It is another object to provide a locking means of the character indicated which will involve substantially no additional axial length insofar as the accommodation of the inner bearing ring on the shaft is concerned.

It is also an object to provide an improved wire locking means of the character indicated.

It is a further object to provide an improved locking means which may be effective regardless of the direction of relative rotation of the bearing and of the shaft or other mounting means.

Also, it is an object to provide an improved locking means which may be self-retaining once installed, and which may utilize standard inner-ring configurations.

It is a specific object to meet the above objects with a locking-ring construction which may be preassembled, and therefore shipped, with a standard bearing.

Other objects and various further features of novelty and invention will be pointed out or will occur to those skilled in the art from a reading of the following specification in conjunction with the accompanying drawings.

In the drawings, which show, for illustrative purposes only, preferred forms of the invention:

Briefly stated, my invention contemplates an improved means for locking an inner bearing ring or the like to a shaft or other mounting means; the invention is particularly useful in the mounting of bearing rings having an eccentric locking counterbore at one end. The locking means in all forms to be described includes a generally longitudinally projecting rounded locking portion which is suitably supported by the shaft or by the inner bearing ring; but the means for support includes provision for the substantially free and unfettered rotation, even though only a partial rotation, of the locking portion about its own axis. In one of the general forms to be described, the locking portion is actually a pin or a roller having complete freedom to rotate about its own axis so that the locking function takes place in a manner analogous to conventional one-way engaging rolling clutches. In the other general form to be described, the locking portion is integrally formed with the supporting portion, but the arrangement is such that there is freedom for sufficient partial rotation of the locking portion to establish a roller-clutch action and thus to provide the desired lock. In certain forms, locks are provided at both ends of the same locking means so that the bearing ring may be locked to the shaft for either or both directions of relative rotation, without entailing loss of grip even when the direction of relative rotation is reversed.

Figure 1:
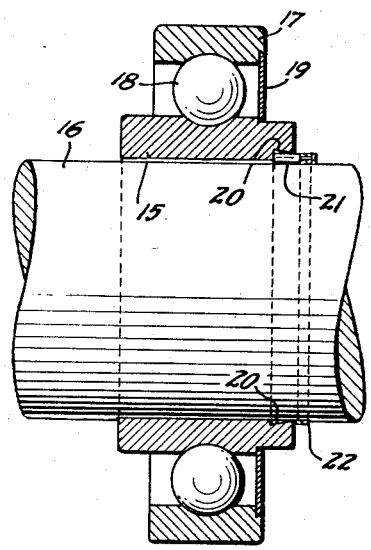
Fig. 1 is a longitudinal sectional view of a bearing secured to a shaft by means incorporating features of the invention.
Figure 2:
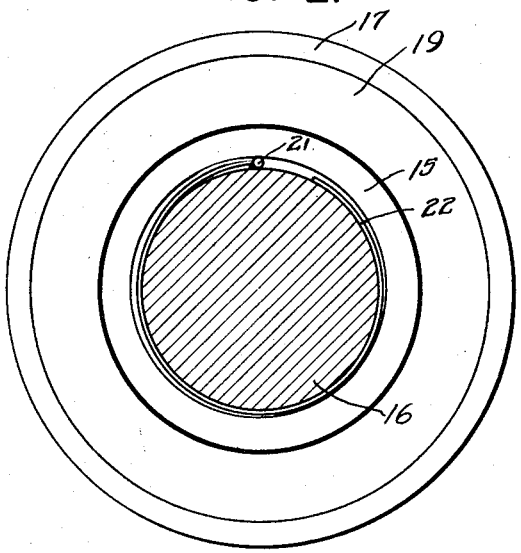
Fig. 2 is a right-end view of the assembly of Fig. 1.
Figure 3:
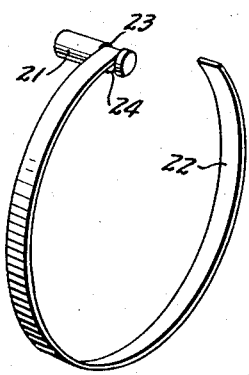
Fig. 3 is a perspective view of the locking means employed in the assembly of Fig. 1.

Referring to Figs. 1, 2, and 3 of the drawings, my invention is shown in application to an improved means for locking the inner bearing ring 15 of an antifriction bearing to a shaft 16. The bearing may include an outer ring 17 spaced from the inner ring 15 by a plurality of antifriction elements 18, and a shield 19 may be carried by the outer ring 17 at one end of the bearing. At one end of the inner bearing ring 15, the bore thereof may be provided with a counterbore 20 eccentric about the bearing axis, for locking purposes.

In accordance with the invention, I provide an improved means for establishing a lock or bind between the counterbore 20 and the shaft 16 upon a relative rotation of these elements. Such locking means may include a locking portion or element 21 extending generally longitudinally and of a thickness intermediate the maximum and minimum radial clearances characterizing the annular space between the counterbore 20 and the shaft 16. The locking portion 21 is preferably rounded or generally cylindrical and is supported with freedom to rotate so that, when the bearing ring 15 and the shaft 16 are relatively rotated, the locking portion or element 21 may partially rotate in a roller-clutch action. In the form shown in Figs. 1, 2, and 3, the locking portion or element 21 is a pin and the supporting means therefor is an open loop 22 of resilient material, which may be a ribbon of spring steel or the like. The pin 21 may be necked or circumferentially grooved, as at 23, near the outer end thereof, thus providing a means of connection to the loop 22. To fasten the loop 22 to the pin 21, one end need only be bent around and lightly crimped, as at 24, at the necked or grooved portion 23. It will be clear that if the loop 22 is of smaller diameter than the shaft when in an unstressed state, then the locking means will be self-retaining on the shaft, as shown clearly in Fig. 2.

Figure 4:
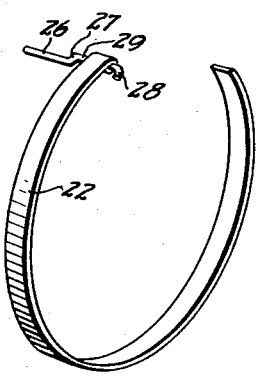
Fig. 4 is another perspective view showing alternative locking means for the assembly of Fig. 1.

In Fig. 4, I show a slightly modified arrangement which may be slightly less expensive to manufacture than the arrangement of Fig. 3. In Fig. 4, the locking portion or element is a suitably bent piece of wire with a first longitudinally projecting portion 26 to perform the locking function in the manner described for the lock of Fig. 3. Two radially offset portions 27—28 may be spaced by a longitudinal portion 29 in order to provide a means for locating the connection of the supporting loop 22 on the locking wire. As long as the radial offset 28 does not project radially inwardly beyond the rotational axis of the locking portion 26 by an amount exceeding the radius of the wire, it will be understood that there may be substantially complete freedom for the wire 26 to rotate in establishing the desired lock or bind. In practice, I find that only a relatively small amount of rotation need be involved in establishing the desired lock. Such rotation will of course depend upon the size of the wire, but for a suitably heavy wire substantially less than half a revolution of the wire will be involved.

Figure 5:
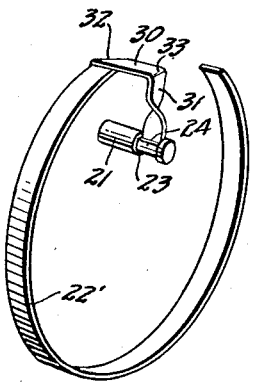
Fig. 5 is another perspective view illustrating a further modification of the Fig. 3 arrangement.
Figure 6:
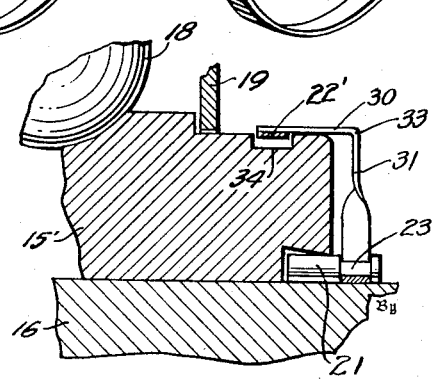
Fig. 6 is an enlarged fragmentary sectional view of a locking means according to Fig. 5, shown assembled with a bearing and shaft.

It is often desirable to ship bearings complete and preassembled with the necessary means for anchoring the bearing on a shaft, and in Fig. 5 I show an arrangement wherein locking means similar to that of Fig. 3 may be preassembled with a bearing. In Fig. 5, the locking portion or element 21 is again supported by an open resilient loop 22', but the loop 22' is connected to the groove 23 in pin 21 by means of adjacent longitudinal and radial offsets 30—31. These offsets may be formed integrally with the ribbon which constitutes the loop 22'. In the form shown, a 45° bend of the ribbon at 32 provides the longitudinal offset 30 and a right-angle bend at 33 joins the radial offset 31 to the longitudinal offset 30. A one-quarter twist in the radial offset 31 may properly orient the ribbon for a good support of the pin 21, as will be clear. It will be understood that a ribbon, such as the ribbon 22' with the longitudinal and radial offsets, may equally well accommodate a locking element such as that (26) shown in Fig. 4, and that in either case the main body or supporting portions of the loop may be adequately located on the inner bearing ring, as in a circumferential groove 34 in the outer surface thereof.

It will be appreciated that I have described novel and extremely simple locking means for anchoring an inner bearing ring to a shaft. The locking action may be positive and non-slipping, for the action is completely analogous to a roller-clutch action. Locking projections may be formed at both ends of the supporting means, so that two-way locking engagement may be effected. The locking means may be so formed as to oppose any play in a transfer of locks during a reversal of relative rotation of the parts.

While I have described my invention in detail for the preferred forms illustrated, it will be understood that modifications may be made within the scope of the invention as defined in the appended claims.

I claim:

1. An article of manufacture, a bearing ring assembly including an inner bearing ring, locking means for anchoring said inner bearing ring to a shaft, the inner bearing ring being formed with a bore for a shaft and having an eccentric locking counterbore at one end, said locking means comprising a rounded longitudinally projecting element of effective thickness less than the difference between the radii of the bore and the counterbore, resilient means wrapping around and embracing a part of said inner bearing ring and supporting said element in said counterbore, said element comprising a pin and said resilient means including a portion loosely surrounding a part of said pin to support the same for rotation.

2. In a locking device, an inner ring member to be anchored to a shaft member, said ring member having a bore to fit the shaft member and having a counterbore at one end eccentric to the bore, locking means for anchoring said ring to the shaft and including a locking pin in said counterbore, said pin being of a diameter less than the difference in radii of said bore and counterbore, an annular expandible resilient band of a diameter at least as great as that of the bore of said ring and generally concentric therewith, said locking pin having a rotatable connection with said annular resilient band and being held thereby in said counterbore and being rotatable in said counterbore, for the purpose set forth.

References Cited in the file of this patent

UNITED STATES PATENTS

| 422,025 | Macdonald | Feb. 25, 1890 |
| 1,031,927 | Haskins | July 9, 1912 |
| 2,576,298 | Kessler | Nov. 27, 1951 |

FOREIGN PATENTS

| 3,945 | Great Britain | of 1895 |